US008637811B2

(12) United States Patent
Steiner et al.

(10) Patent No.: US 8,637,811 B2
(45) Date of Patent: Jan. 28, 2014

(54) STABILIZED ELECTRON MULTIPLIER ANODE

(75) Inventors: Urs Steiner, Branford, CT (US); Roy P Moeller, San Leandro, CA (US); David Deford, Pleasanton, CA (US)

(73) Assignee: Bruker Daltonics, Inc., Billerica, MA (US)

( * ) Notice: Subject to any disclaimer, the term of this patent is extended or adjusted under 35 U.S.C. 154(b) by 321 days.

(21) Appl. No.: 13/184,022

(22) Filed: Jul. 15, 2011

(65) Prior Publication Data

US 2013/0015767 A1 Jan. 17, 2013

(51) Int. Cl.
*B01D 59/44* (2006.01)

(52) U.S. Cl.
USPC ...................................... 250/283; 313/103 R

(58) Field of Classification Search
USPC ....................... 313/103 R, 230; 250/282, 283
See application file for complete search history.

(56) References Cited

U.S. PATENT DOCUMENTS 2,071,515 A * 2/1937 Farnsworth .................. 348/330
2,150,317 A * 3/1939 Clark ............................. 313/21
5,665,966 A * 9/1997 Dahl et al. ................ 313/103 R
2004/0095102 A1 5/2004 Koudelka et al.
2004/0232835 A1 11/2004 Keller et al.

* cited by examiner

*Primary Examiner* — Thuy Vinh Tran
(74) *Attorney, Agent, or Firm* — Robic, LLP

(57) ABSTRACT

Methods and systems to compensate for distortions created by dynamic voltage applied to an electron multiplier used in mass spectrometry. An electron multiplier has a cathode end accepting ion flow, an opposite emitter end and an interior surface. The electron multiplier produces an electron output from ions colliding with the interior surface. A variable power supply has a voltage output coupled to the cathode end and the emitter end of the electron multiplier. The voltage output changes dynamically to adjust the electron output from the electron multiplier. An anode is located in proximity to the electron multiplier. An electrometer is coupled to the anode in proximity to the electron multiplier to measure the current generated by the electron output. A low pass filter circuit is coupled to the emitter end to the ground of the electrometer to attenuate emitter voltage changes. A bias circuit is coupled to the emitter end to stabilize emitter to anode voltage difference.

15 Claims, 3 Drawing Sheets

STABILIZED ELECTRON MULTIPLIER ANODE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

This disclosure relates generally to mass spectrometry and specifically to a circuit to provide voltage stabilization for anode bias in an electron multiplier.

BACKGROUND

Mass spectrometry is a widely used analytical technique that measures the mass-to-charge ratio of charged particles from a sample chemical compound. Mass spectrometry has many applications such as determining particle mass, the elemental composition of a sample or molecule, and the chemical structures of molecules, such as peptides and other chemical compounds. In the mass spectrometry process, chemical compounds are ionized to generate charged molecules or molecule fragments and measuring their mass-to-charge ratios.

In a typical mass spectrometry system, a sample is loaded onto the mass spectrometer and undergoes vaporization. The components of the sample are ionized by one of a variety of methods, such as exposure to an electron beam, which results in the formation of ions. The ions are separated according to their mass-to-charge ratio in an analyzer by electromagnetic fields.

A mass spectrometer includes an ion source, a mass analyzer and an electron detector. The ion source converts gas phase sample molecules into ions. The mass analyzer sorts the ions by their masses by applying electromagnetic fields. The electron detector measures the value of an indicator quantity and thus provides data for calculating the abundances of each ion present.

A typical electron detector includes an electron multiplier that is a cylindrical tube having a cathode at one end and an anode at the opposite end. The ions are injected at the cathode and an electrical voltage is applied between the cathode and the anode resulting in the ions being exciting and colliding with the interior surface of the cylinder to produce electrons. The collisions create an avalanche of electrons which exit a hole at the opposite end of cylinder and are collected by the anode. An electrometer is connected to the anode to measure the resulting current. The amount of electrons produced is measured by electron gain which is a function of the voltage between the cathode and the emitter nodes. The higher the applied voltage, the more energetic the electrons from the ions are thereby producing more electrons, and therefore the more the gain increases.

Conventional electron detectors set the voltage at a fixed value and gain is constant over time. The user may calibrate the electron gain and determine the current at the anode. It is desirable to adjust the voltage over a dynamic range to create a larger signal for measurement purposes. Different ranges of voltages are desirable since the ion strength of the measured compounds changes with the type of compound. The signal ranges are limited in a fixed voltage because of the drift (lower limit) and a high limit set by the saturation point from a certain voltage.

Present electron detectors provide dynamic range by determining the highest peak of a signal and for the next scan the electron multiplier is set to an appropriate gain with the peak value. This produces a large range for the detector, but when the voltage between the cathode and anode changes quickly in such dynamic ranging, a transient error signal is introduced into the electrometer through capacitive coupling to its electron collector. A common configuration of electron multipliers is have a bias resistor at the anode (emitter) end that generates, as a result of the channel current flowing through the resistor, a bias voltage for attracting the exiting electrons to the electrometer collector. Since the channel resistance and bias resistor form a voltage divider, changes in the multiplier voltage also result in changes to the bias voltage. Additionally, capacitive coupling through the channel body, from cathode to emitter, also perturbs the emitter potential. Such bias changes may result in minor changes in collection efficiency, but more importantly, the emitter potential changes are capacitively coupled to the electrometer collector.

In order to solve such distortions, a zener diode has been connected in place of the integral resistor, which stabilizes the voltage and reduces the error. However zener diodes still have problems that cause additional distortion. Zener diodes do not provide perfect voltage regulation and cause slight voltage changes when the current through the zener diode changes. Further, relatively high voltage zener diodes are required to ensure efficient electron collection by the electrometer. In avalanche mode, zener diodes produce diode noise thereby adding noise to the output signal of the electron multiplier.

Therefore it would be desirable to have an electron detector that is capable of dynamic range without distortions from current produced from the parasitic resistance in the electron multiplier tube channel in conjunction with the applied voltage. It would be desirable for a circuit that may correct for distortions that may be integrated with the mechanical components of the electron detector. It would also be desirable to have a circuit to compensate for the transient current generated by capacitive coupling between the cathode and anode electrodes when the channel voltage changes dynamically. It would also be desirable to have a circuit to compensate for distortions from an avalanche voltage for a zener diode used to compensate for voltage distortions. It would be desirable to have a compensation circuit that is small enough to be included in the vacuum around certain parts of the electron multiplier.

SUMMARY

Aspects of the present disclosure include a system for stabilization of electron multiplier anode bias under a dynamic voltage input. An electron multiplier has a cathode end receiving an ion flow, an opposite emitter end and an interior surface. The electron multiplier produces an electron output from ions colliding with the interior surface. A variable power supply has a voltage output coupled to the cathode end and the emitter end of the electron multiplier. The voltage output changes dynamically to adjust the electron output from the electron multiplier. An anode is located in proximity to the electron multiplier. An electrometer is coupled to the anode in proximity to the electron multiplier to measure the current generated by the electron output. A low pass filter circuit is coupled to the emitter end to the ground of the electrometer to attenuate emitter voltage changes. A bias circuit is coupled to the emitter end to stabilize emitter to anode voltage difference.

Another disclosed example is a method of stabilizing voltage output from an ion detector having an electron multiplier with a cathode, an anode and an emitter between the cathode and the anode. An ion stream is received via the electron multiplier. An electron stream is produced by applying a voltage between the electron multiplier cathode and anode. Electron multiplication is dynamically adjusted in the electron multiplier by changing the voltage. The voltage drop between the electron multiplier anode and a common ground of an electrometer is stabilized via a zener diode. Noise generated by the zender diode is attenuated via a low pass filter. The emitter voltage is filtered to eliminate changes to the emitter voltage caused by the dynamic gain controlling voltage input via a bias circuit.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
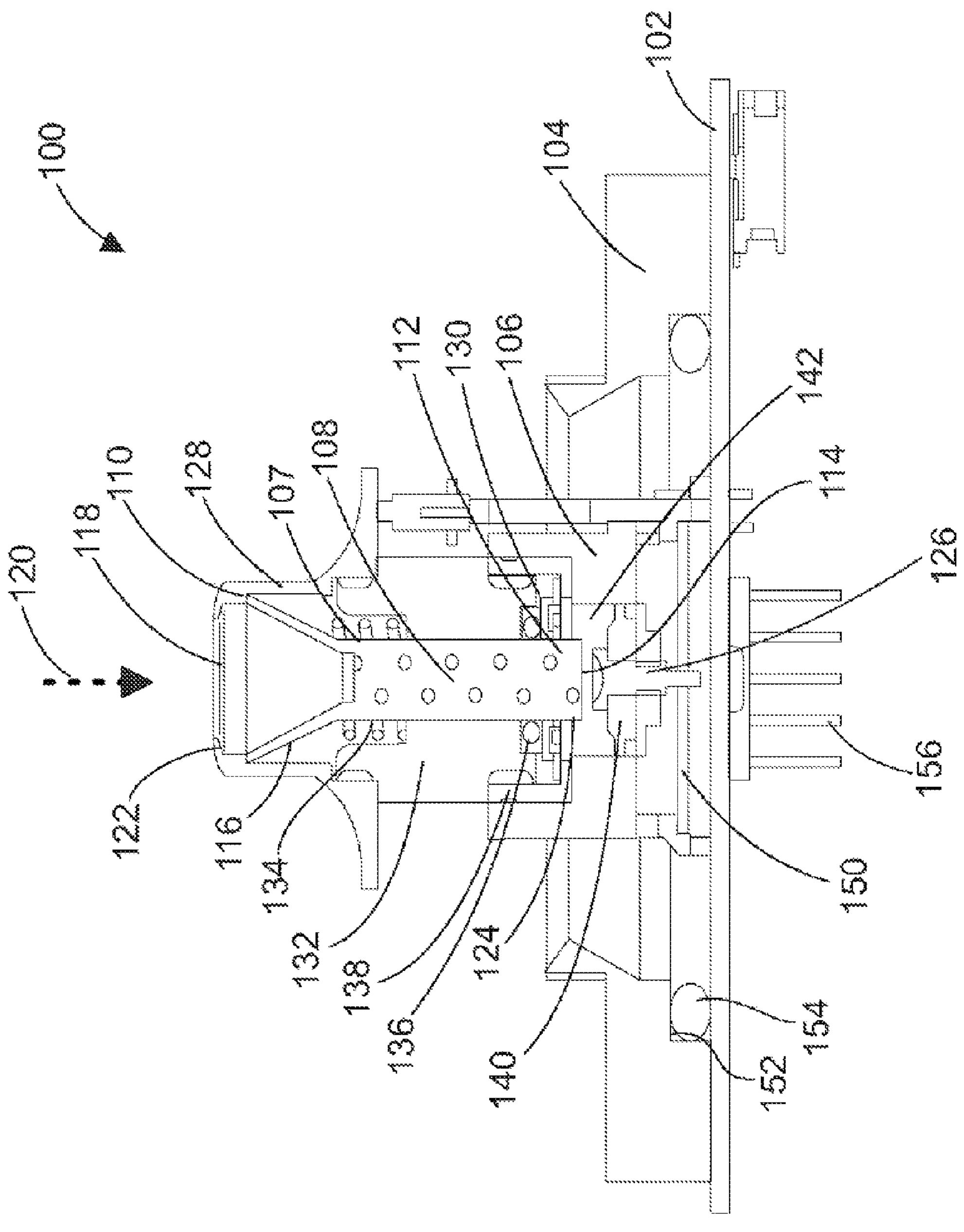
FIG. 1 is a view of an electron multiplier used in an ion detector for mass spectrometry applications.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a cross section view of an ion detector 100 that may be used in the electron detector module of a mass spectrometer. The ion detector 100 has a flat mounting board 102 that sits a vacuum feed through ring 104. The mounting board 102 also mounts an annular electrometer shield 106. An electron multiplier 107 has a cylindrical channel body 108 with an interior surface, a cathode end 110 and an opposite emitter end 112. The opposite emitter end 112 has a hole 114 for the emission of electrons. The cathode end 110 has a conically shaped section 116 with an open ion entrance 118 that receives an ion stream 120. A cathode 122 is created at the cathode end 110 with an electrical connection to a voltage source as will be explained below. An emitter 124 is coupled to the cylindrical channel body 108 near the opposite emitter end 112. The electron multiplier 107 produces an electron stream output from ions colliding with the interior surface of the cylindrical channel body 108. An anode 126 is placed in proximity to the hole 114 to receive emitted electrons from the hole 114. Electron current collected by the anode 126 is converted to ion signal voltage by an electrometer as will be explained below. The system that includes the electron multiplier 107 stabilizes anode bias under a dynamic voltage input. A cathode cap 128 fits over the ion entrance 118. The cylindrical channel body 108 has a glass or ceramic body. The interior of the cylindrical channel body 108 and the conically shaped section 116 are coated with a partially conducting glass which is chemically treated to allow high electron emission. Metallic coatings are applied to the exterior of each end 110 and 112 to provide connection to the interior coating of the cylindrical channel body 108.

A bias circuit board 130 has a circular opening for the insertion of the cylindrical channel body 108. The electron multiplier 107 is housed in an assembly that includes the threaded anti-corona cathode cap 128, an insulating plastic body 132, a helical cathode spring 134, a bias board contact spring 136, and a threaded metal end cap 138. In this example, the emitter contact coating is extended up the outside of the glass stem to make contact to the bias board contact spring 138 and therefore to the bias circuit board 130. The helical cathode spring 134 compresses the cathode cap 128 into the cylindrical channel body 108. The end cap 138 is connected to the electrometer shield 106 via a retaining set screw so the electrometer, emitter and collector are well shielded by the enclosure formed by the electrometer shield 106 and the end cap 138. The anode 126 is inserted through a series of washers 140 seated in the electrometer shield 106 to isolate the enclosure.

The bias circuit board 130 is mounted near the opposite emitter end 112 of the cylindrical channel body 108. The bias board contact spring 136 is a conductive toroidal spring that ensures connection between the circular opening of the bias circuit board 130 and the conductive coating of the emitter end 112. The electrometer shield 106 encloses the opposite emitter end 112 of the cylindrical channel body 108 and creates an electron emission chamber 142 that includes a gap between the hole 114 and the anode 126. The anode 126 is mounted on an electrometer circuit board 150. The interior of the vacuum feed through ring 104 includes a groove 152 that interfaces with the mounting board 102. An O-ring 154 contains the vacuum seal potting epoxy within the vacuum feed through ring 104. The epoxy fills the annular space between the vacuum feed through ring 104 and the electrometer shield 106. The epoxy also fills the space above the electrometer circuit board 150. The washers 140 stop the epoxy from entering the chamber 142. An electrical connector 156 is located on the opposite end of the mounting board 102 to provide inputs and outputs to the electrometer circuit board 150.

In operation, the ion stream 120 produced from a sample compound is directed through the cylindrical channel body 108. A voltage is applied between the cathode 122 and the anode 126 to determine the electrons produced by the electron multiplier 107 from the ion stream 120. The applied voltage between the anode 126 and the emitter 124 (termed the channel voltage) determines the gain value for the electron multiplier 107. The electron output exiting the emitter end 112 generate a current on the anode 126 which is measured by electronic components on the electrometer circuit board 150.

Figure 2:
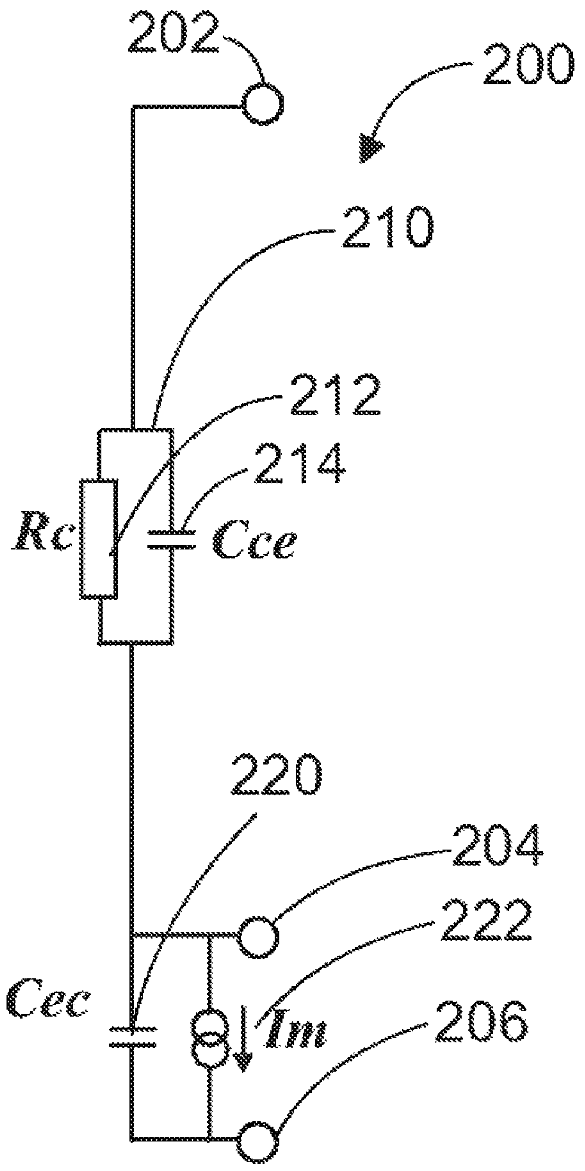
FIG. 2 is a circuit diagram of the electrical circuit equivalent for the electron multiplier in FIG. 1.

FIG. 2 is a circuit diagram of an equivalent circuit 200 of the electron multiplier 107 combined with the bias circuit on the bias circuit board 130 in FIG. 1. The equivalent circuit 200 includes a cathode node 202, an emitter node 204 and an anode node 206. The cylindrical channel body 108 in FIG. 1 is represented by a channel circuit 210 between the cathode 122 and the emitter 124 in FIG. 1. The channel circuit 210 has the electrical impedance equivalent of a channel resistance 212 and a channel capacitance 214 representing the capacitance between the cathode node 202 and the emitter node 204.

A capacitance represented by the capacitor 220 is created between the emitter node 204 and the anode node 206 by the close proximity of these two conductors. An emitter current 222 is the gain amplified electron current measured by the electrometer as will be explained below. Any bias circuit connected to the emitter node 204 must be able to maintain a constant potential on the emitter node 204 regardless of currents entering the emitter node 204 from the channel circuit 210 or the capacitance 220 in addition to emitter current 222.

Figure 3:
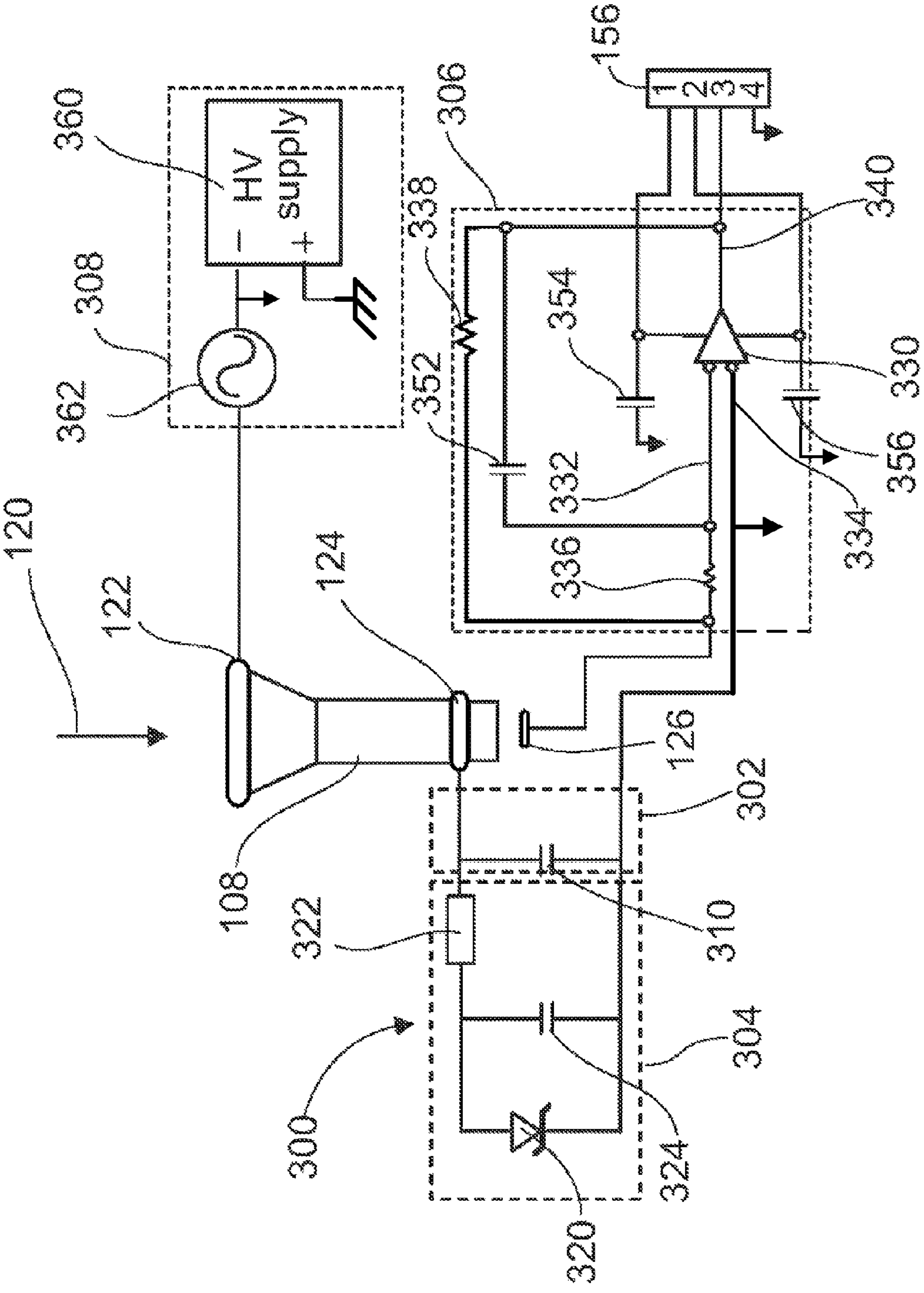
FIG. 3 is a circuit diagram of the example filter and bias circuit in the electron detector in FIG. 1.

FIG. 3 is a circuit diagram of the compensation circuit 300 that is connected to the electron multiplier 107 from FIG. 1. As explained above, the components of the compensation circuit 300 are mounted on the bias circuit board 130 in FIG. 1. Like elements are labeled with identical element numbers in FIG. 1. The compensation circuit 300 includes a low pass filter 302 and a bias circuit 304. An electrometer 306 is coupled to the compensation circuit 300 and the anode 126 of the electron multiplier 107. The components of the electrometer 306 are mounted on the electrometer circuit board 150 in FIG. 1. The low pass filter 302 is connected from the multiplier emitter 124 to the ground of the electrometer 306. The bias circuit 304 is coupled in parallel to the low pass filter 302 and the electrometer 306. The electron multiplier 107 is powered by a voltage circuit 308 that produces a voltage value between the cathode 122 and the anode 126. As explained above, the voltage circuit 308 is a variable power supply producing a dynamic range of voltages to the electron multiplier 107 in order to provide measurements for different compounds with different ion streams. The voltage output of the voltage circuit 308 changes dynamically to adjust the electron output or multiplication from the electron multiplier 107. The compensation circuit 300 therefore corrects from distortions from the components of the equivalent circuit 200 shown in FIG. 2 to allow the dynamic ranging of the voltage to the electron multiplier 107. Specifically, distortions may be generated from the currents from the channel resistance 212 and from the capacitive currents through the capacitance 214 from rapid changes in voltage to the electron multiplier 107.

The low pass filter 302 includes a bypass capacitor 310 that is coupled between the emitter 124 and the ground of the electrometer 306. This filter bandpass is primarily determined by the multiplier channel resistance 212 in FIG. 2, a bias resistor from the bias circuit 304 and the bypass capacitor 310. The capacitor value of the bypass capacitor 310 and the bias resistor value in the bias circuit 304 are chosen to shunt capacitive currents from the cathode 122 to the ground of the electrometer 306 thus attenuating the emitter voltage changes and subsequent coupling to the electrometer 306. Thus voltage generated as a result of dynamic voltage changes applied to the cathode node 202 in FIG. 2 is eliminated.

The bias circuit 304 includes a zener diode 320, an input resistor 322 and a capacitor 324. The zener diode 320 ensures a stable low frequency bias required for efficient electrometer collection of electrons from the emitter 124 on the cylindrical channel body 108 of the multiplier 107. The reverse current through the zener diode 320 is on the average equal to the channel current which is the channel voltage divided by the channel resistance 212 in FIG. 2. The value of the input resistor 322 is chosen to give both a minimum loading of a low pass filter created by the capacitor 324 and a minimum voltage drop generated by the multiplier channel current 222 in FIG. 2. The capacitor 324 therefore attenuates the intrinsic noise generated by the zener diode 320.

The electrometer 306 in this example includes an operational amplifier 330 having a first input 332 coupled to the anode 126 and a second input 334 coupled to a ground that serves as the ground for the electrometer 306. The anode 126 is coupled via a resistor 336 to the first input 332. A resistor 338 is coupled in a feedback configuration between one end of the resistor 336 and an output 340 of the operational amplifier 330. A capacitor 352 is coupled to the opposite end of the resistor 336 and the output 340 of the operational amplifier 330. The voltage pins of the operational amplifier 330 are coupled to the positive and negative voltage inputs of the electrical connector 156. A capacitor 354 and a capacitor 356 connects the voltage pins of the operational amplifier 330 to ground to smooth out the voltage inputs. The electrometer 306 therefore outputs voltage proportional to the current sensed on the anode 126 which is a function of the electrons produced by the electron multiplier 107.

The voltage circuit 308 includes a high voltage power supply 360 and a power regulator 362. The power regulator 362 may be adjusted to provide different output voltages to the cathode 122 of the electron multiplier 107. Other controls (not shown) in the mass spectrometer system set the output voltage of the power regulator 362 according to the range of ion emission from the compounds being analyzed.

In this example, the components of the compensation circuit 300 may be mounted or affixed on the bias circuit board 130 at the opposite emitter end 112 of the electron multiplier 107 and within the electrometer shield 106 as shown in FIG. 1. Use of surface mount components allows reduced size, reduces stray coupling and minimizes shielding requirements for the compensation circuit 300.

The ion detector 100 when operated with the high voltage power supply 360 is sensitive to ripple and the voltage change created by rapid slewing of channel voltage during gain changes that occur during dynamic ranges of ion fluxes created by the regulator 362. Capacitive coupling of changes in multiplier emitter voltage to the electrometer input 332 in FIG. 3 introduces an error in the output of the electrometer 306 absent the compensation circuit 300. Ripple on a high voltage supply such as the voltage circuit 308 for the electron multiplier 107 results in noise on the signal baseline. Rapid changes in a set point for the high voltage produce output transients may create errors in the measured ion signal. The compensation circuit 300 connected between the bottom of the channel resistance 212 in FIG. 2 and the electrometer ground reference eliminates both the feed-through of channel voltage noise and baseline shifts resulting from intentional modulation of the multiplier gain from the power regulator 362. This is particularly useful in mass spectrometer detectors where rapid changes of gain settings are required to maintain wide dynamic range of ion fluxes.

The compensation circuit 300 eliminates these perturbations without resorting to a separate anode bias supply. The small size of the compensation circuit 300 allows it to be incorporated into the electron multiplier 107, reducing shielding requirements since it is contained within the electrometer shield 106. The compensation circuit 300 therefore may be included in the vacuum created by the vacuum feed through ring 104.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system for stabilization of electron multiplier anode bias under a dynamic voltage input, comprising:

an electron multiplier having a cathode end receiving an ion flow, an opposite emitter end and an interior surface, the electron multiplier producing an electron output from ions colliding with the interior surface;

a variable power supply having a voltage output coupled to the cathode end and the emitter end of the electron multiplier, the voltage output changing dynamically to adjust the electron output from the electron multiplier;

an anode in proximity to the electron multiplier;

an electrometer coupled to the anode in proximity to the electron multiplier to measure the current generated by the electron output;

a low pass filter circuit coupled between the emitter end to the ground of the electrometer, the low pass filter to attenuate emitter voltage changes; and a bias circuit coupled to the emitter end to stabilize emitter to anode voltage difference.

2. The system of claim 1, wherein the low pass filter circuit includes a bypass capacitor coupled between the bias resistor and the ground of the electrometer.

3. The system of claim 2, wherein the bypass capacitor value is selected based on channel impedance of the electron multiplier.

4. The system of claim 1, wherein the bias circuit includes:

an input resistor coupled to the emitter of the electron multiplier;

a zener diode coupled to the input resistor and ground; and a capacitor coupled in parallel to the zener diode.

5. The system of claim 4, wherein the resistor value and capacitor value is selected to minimize loading of the capacitor and voltage drop generated by the current created by the dynamic voltage.

6. The system of claim 1, further comprising an electrometer shield enclosing a part of the electron multiplier, wherein the low pass filter and bias circuit are integrated in the electrometer shield.

7. The system of claim 1, wherein the electron multiplier includes a cylindrical channel body and wherein the interior surface is treated to allow high electron emission.

8. The method of claim 1, wherein the electron multiplier includes a cylindrical channel body having an interior surface is treated to allow high electron emission via collisions from the ion stream.

9. A method of stabilizing voltage output from an ion detector having an electron multiplier with a cathode, an anode, and an emitter between the cathode and the emitter, the method comprising:

receiving an ion stream via the electron multiplier;

producing an electron stream by applying a voltage between the electron multiplier cathode and anode;

dynamically adjusting electron multiplication in the electron multiplier by changing the voltage;

stabilizing the voltage drop between the electron multiplier anode and a common ground of an electrometer via a zener diode;

attenuating noise generated by the zender diode via a low pass filter; and filtering the emitter voltage to eliminate changes to the emitter voltage caused by the dynamic gain controlling voltage input via a bias circuit.

10. The method of claim 9, further comprising measuring the electron stream by the electrometer.

11. The method of claim 9, wherein the low pass filter circuit includes a bypass capacitor coupled between the bias resistor and the ground.

12. The method of claim 11, wherein the bypass capacitor value is selected based on channel impedance of the electron multiplier.

13. The method of claim 9, wherein the bias circuit includes an input resistor coupled to the emitter of the electron multiplier;

a zener diode coupled to the input resistor and ground; and a capacitor coupled in parallel to the zener diode.

14. The method of claim 13, wherein the resistor value and capacitor value is selected to minimize loading of the capacitor and voltage drop generated by the current created by the dynamic voltage.

15. The method of claim 9, further comprising enclosing a part of the electron multiplier via an electrometer shield, wherein the low pass filter and bias circuit are integrated in the electron shield.

* * * * *